(12) United States Patent
Zhao et al.

(10) Patent No.: US 10,913,502 B2
(45) Date of Patent: Feb. 9, 2021

(54) GIANT SIX-LEGGED POLAR RESEARCH VEHICLE WITH TRACKED FEET

(71) Applicants: Taiyuan University of Science and Technology, Shanxi (CN); Taiyuan University of Technology, Shanxi (CN); Polar Research Institute of China, Shanghai (CN)

(72) Inventors: Fuqiang Zhao, Shanxi (CN); Pengyang Du, Shanxi (CN); Qingxue Huang, Shanxi (CN); Baoyu Chang, Shanxi (CN); Yinke Dou, Shanxi (CN); Bo Sun, Shanghai (CN); Tie Wang, Shanxi (CN); Jingxue Guo, Shanghai (CN)

(73) Assignees: Taiyuan University of Science and Technology, Taiyuan (CN); Taiyuan University of Technology, Taiyuan (CN); Polar Research Institute of China, Shanghai (CN)

( * ) Notice: Subject to any disclaimer, the term of this patent is extended or adjusted under 35 U.S.C. 154(b) by 0 days.

(21) Appl. No.: 16/447,969

(22) Filed: Jun. 21, 2019

(65) Prior Publication Data
US 2020/0216125 A1    Jul. 9, 2020

(30) Foreign Application Priority Data

Jan. 7, 2019   (CN) .......................... 2019 1 0013032

(51) Int. Cl.
*B62D 57/02*   (2006.01)
*H02S 10/12*   (2014.01)
(Continued)

(52) U.S. Cl.
CPC ............ *B62D 57/022* (2013.01); *B62D 11/04* (2013.01); *B62D 55/0655* (2013.01);
(Continued)

(58) Field of Classification Search
CPC ...... B62D 57/00; B62D 57/02; B62D 57/022; B62D 57/0655; B62D 11/02; B62D 11/04; H02S 10/12
See application file for complete search history.

(56) References Cited

U.S. PATENT DOCUMENTS

| | | | | |
|---|---|---|---|---|
| 4,558,758 A | * | 12/1985 | Littman | ................. B62D 7/026 180/236 |
| 5,857,533 A | * | 1/1999 | Clewett | ................. B62D 57/00 180/8.1 |

(Continued)

FOREIGN PATENT DOCUMENTS

| | | |
|---|---|---|
| CN | 103481786 A | 1/2014 |
| CN | 109079746 A | 12/2018 |
| JP | 2017024149 A | 2/2017 |

*Primary Examiner* — Brian L Swenson
(74) *Attorney, Agent, or Firm* — Wayne & Ken, LLC; Tony Hom

(57) ABSTRACT

A giant six-legged polar research vehicle with tracked feet, including a platform, six legs arranged at six ends of the platform and six tracked feet arranged below the six legs. A monitoring device is arranged on a top cover. Six power compartments each having a steering device are arranged at six ends of a chassis in the platform. Each leg includes a main traveling device with an upper end and a lower end respectively connected to the steering device and a tracked foot, an auxiliary traveling device with an upper end and a lower end respectively connected to the chassis and the main traveling device, and a connecting device arranged on the main traveling device. The tracked foot includes a main flipping mechanism, an auxiliary flipping mechanism, a tracked foot slewing device, a crawler, a sliding plate and a suspension.

6 Claims, 10 Drawing Sheets

(51) Int. Cl.
*H02S 10/40* (2014.01)
*F03D 9/25* (2016.01)
*B62D 11/04* (2006.01)
*B62D 55/065* (2006.01)
*B62D 55/104* (2006.01)

(52) U.S. Cl.
CPC ............ *B62D 55/104* (2013.01); *F03D 9/25* (2016.05); *H02S 10/12* (2014.12); *H02S 10/40* (2014.12)

(56) References Cited

U.S. PATENT DOCUMENTS

| | | | |
|---|---|---|---|
| 9,359,028 B2 * | 6/2016 | Jun | B62D 57/032 |
| 2002/0060267 A1 * | 5/2002 | Yavnai | B64C 39/024 |
| | | | 244/23 A |
| 2008/0196758 A1 * | 8/2008 | McGuire | H02S 10/12 |
| | | | 136/245 |
| 2011/0146751 A1 * | 6/2011 | McGuire | F24S 25/33 |
| | | | 136/245 |
| 2013/0338825 A1 * | 12/2013 | Cantor | B62D 55/02 |
| | | | 700/245 |
| 2016/0251044 A1 * | 9/2016 | Klassen | B62D 57/022 |
| | | | 180/8.7 |

* cited by examiner

GIANT SIX-LEGGED POLAR RESEARCH VEHICLE WITH TRACKED FEET

CROSS-REFERENCE TO RELATED APPLICATIONS

This application claims the benefit of priority from Chinese Patent Application No. CN201910013032.8, filed on Jan. 7, 2019. The content of the aforementioned application, including any intervening amendments thereto, is incorporated herein by reference in its entirety.

TECHNICAL FIELD

The present disclosure relates to polar research equipment and technology, in particular to a six-legged polar research vehicle with tracked feet.

BACKGROUND OF THE INVENTION

The polar environment is characterized by low temperature, strong wind and complex terrain. It has high cost, high risk and geographical limitation for research in the polar environment. The existing polar research vehicle mainly operates in a small area centered on the scientific investigation station, which cannot realize long-distance and large-area polar research. Specifically, it cannot cross the crevasse and cracks and hardly travels in a terrain with obstacles. It is difficult for the polar research vehicle to turn over when it is stuck in the crevasses and cracks.

SUMMARY OF THE INVENTION

The purpose of the present disclosure is to design a six-legged polar research vehicle with tracked feet for the polar region with special geographical environment, which can meet the needs of long-distance, large-area research in the polar region with low temperature, strong wind and complex terrain environment. The vehicle is able to travel across the crevasse and cracks and the uneven snow and ice area, and realizes the lifting and lowering of the platform.

A six-legged polar research vehicle with tracked feet, including a platform, six legs arranged at six ends of the platform, and six tracked feet arranged below the six legs.

The platform includes a top cover, a chassis, a photovoltaic power generator, a monitoring device, six power compartments and six steering devices. The monitoring device is arranged on a middle of the top cover. The wind generator set is arranged on an edge of the top cover. The photovoltaic power generator is arranged on an outer side of the top cover. The top cover is fixed on the chassis. Six power compartments are separately arranged at six ends of the chassis. Each power compartment is provided with a steering device therein. Movable baffles are arranged on outer sides of the power compartments.

The six legs have the same structure, each including a main traveling device, an auxiliary traveling device and a connecting device. An upper end of the main traveling device is connected to the steering device of the platform, and a lower end of the main traveling device is connected to a tracked foot. An upper end of the auxiliary traveling device is connected to the chassis, and a lower end of the auxiliary traveling device is connected to the main traveling device. The connecting device is arranged on the main traveling device.

The six tracked feet have the same structure, each including a main flipping mechanism, an auxiliary flipping mechanism, a tracked foot slewing device, a crawler, a sliding plate and a suspension. The main flipping mechanism is arranged at a front side of the lower end of the main traveling device. The auxiliary flipping mechanism is arranged at a rear side of the lower end of the main traveling device. The tracked foot slewing device is arranged above a middle of the crawler. The sliding plate is arranged under the crawler. A middle of the sliding plate is connected to the crawler. The suspension is arranged on the sliding plate. An upper end of the suspension is connected to the crawler. A lower end of the suspension is connected to the sliding plate.

The main traveling device includes an upper leg, a middle leg, a damping device, a lower leg, a wind power generator compartment, a wind power generator, two upper leg hydraulic pushrods with same structure and a middle leg hydraulic pushrod. An upper end of the upper leg is connected to the steering device. A lower end of the upper leg is connected to a middle portion of the middle leg. One end of the damping device is connected to a lower end of the middle leg. The other end of the damping device is connected to an upper end of the lower leg. A lower end of the lower leg is connected to the tracked foot slewing device. A middle portion of the lower leg is provided with the wind power generator compartment. The wind power generator is arranged in the wind power generator compartment. The two upper leg hydraulic pushrods are uniformly arranged at opposite sides of the upper leg. One end of each upper leg hydraulic pushrod is connected to the steering device, and the other end of each upper leg hydraulic pushrod is connected to a middle portion of the upper leg. One end of the middle leg hydraulic pushrod is connected to the middle portion of the upper leg, and the other end of the middle leg hydraulic pushrod is connected to an upper end of the middle leg.

The auxiliary traveling device includes two extensible auxiliary rods and auxiliary rod bases uniformly arranged on opposite sides of the main traveling device. A bottom of each auxiliary rod base is fixed between two adjacent power compartments. Each auxiliary rod base is connected to one end of each extensible auxiliary rod, and the other end of each extensible auxiliary rod is connected to a top of the wind power generator compartment.

The connecting device includes an extensible tapered connecting rod and an extensible bar-type connecting rod. Upper ends of the retractable tapered connecting rod and the extensible bar-type connecting rod are both connected to the wind power generator compartment.

The main flipping mechanism includes two main connecting levers in parallel with each other, two main rocker in parallel with each other and a flipping hydraulic pushrod. One end of the main connecting lever is connected to the lower end of the lower leg, and the other end of the main connecting lever is connected to an upper end of the main rocker. A lower end of the main rocker is connected to the tracked foot slewing device. One end of the flipping hydraulic pushrod is connected to the upper end of the main rocker, and the other end of the flipping hydraulic pushrod is connected to the middle of the lower leg.

The auxiliary flipping mechanism includes two auxiliary connecting rods in parallel with each other and two auxiliary rockers in parallel with each other. One end of each auxiliary connecting rod is connected to the lower end of the lower leg, and the other end of each auxiliary connecting rod is connected to an upper end of each auxiliary rocker. A lower end of each auxiliary rocker is connected to the tracked foot slewing device.

The present disclosure has the following beneficial effects. The six-legged polar research vehicle with tracked feet has a huge body. The tracked feet can cooperate with the legs to enable the vehicle to realize long-distance and large-area traveling in polar region and travel across the crevasse and cracks. The platform is provided with a monitoring device which can meet the long-distance polar research. The leg have a high carrying capacity. The vehicle further has the function of wind power generator. The six tracked feet can evenly bear the load and have large effective contact area with the ground, such that the overall structure is more stable. The main flipping mechanism, the auxiliary flipping mechanism and the tracked foot slewing device operate together to enable the vehicle to turn over and travels out of the crevasse.

Figure 1:
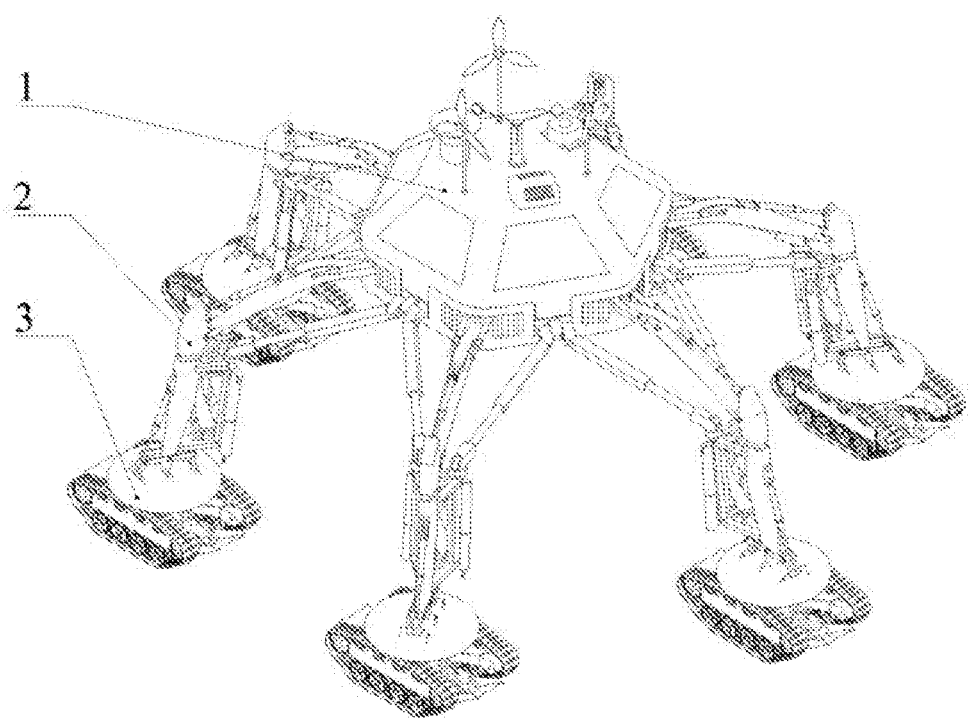
FIG. 1 is a schematic diagram of a six-legged polar research vehicle with tracked feet.

REFERENCE NUMERALS 1, platform; 2, leg; 3, tracked foot; 101, photovoltaic power generator; 102, top cover; 103, monitoring device; 104, wind generator set; 105, movable baffle; 106, power compartment; 107, chassis; 108, internal combustion engine power device; 109, power battery pack; 110, oil tank; 111, steering device; 201, main traveling device; 202, auxiliary traveling device; 203, connecting device; 20101, wind power generator; 20102, wind power generator compartment; 20103, lower leg; 20104, damping device; 20105, middle leg; 20106, middle leg hydraulic pushrod; 20107, upper leg; 20108 and 20109, upper leg hydraulic pushrods; 2011 and 2012, extensible auxiliary rods; 20203 and 2024, auxiliary rod bases; 20301, extensible bar-type connecting rod; 20302, extensible tapered connecting rod; 20303, locking pin; 20304, lockable taper hole; 301, main flipping mechanism; 302, auxiliary flipping mechanism; 303, tracked foot slewing device; 304, crawler; 305, sliding plate; 306, suspension; 30101, 30104, main connecting lever; 30102, 30103, main rocker; 30105, flipping hydraulic pushrod; 30201, 30202, auxiliary connecting rod; 30203, 30204, auxiliary rocker.

DETAILED DESCRIPTION OF EXAMPLES

The embodiments of the present invention will be described in detail below.

As shown in FIG. 1, this embodiment includes a platform 1, six legs 2 separately arranged at six ends of the platform 1, and six tracked feet 3 separately arranged under the six legs 2. The six legs 2 have the same structure, and the six tracked feet 3 have the same structure. Preferably, the platform 1 adopts a regular hexagonal structure.

Figure 2:
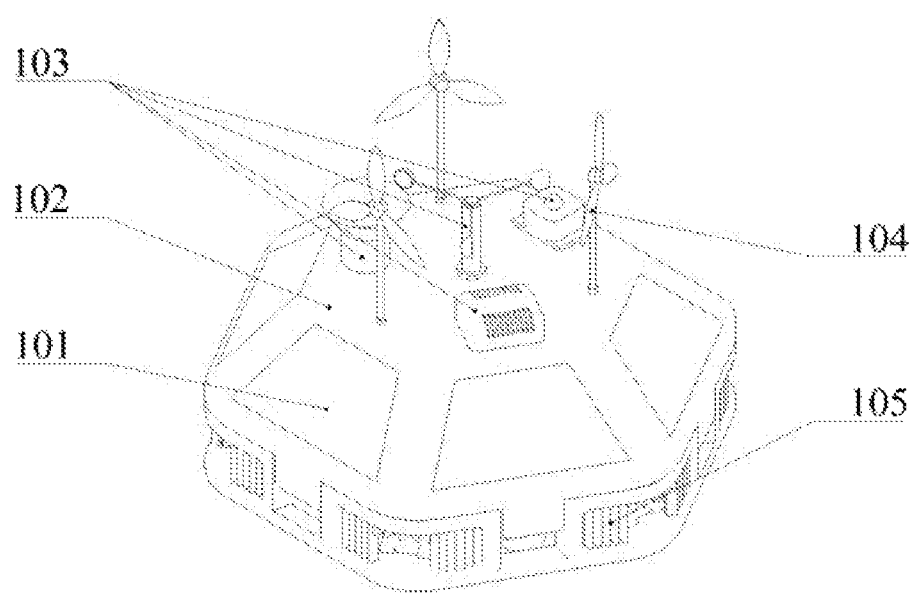
FIG. 2 is a schematic diagram of a platform of the six-legged polar research vehicle with tracked feet.

As shown in FIG. 2, the platform 1 specifically includes a photovoltaic power generator 101, a top cover 102, a monitoring device 103, a wind generator set 104, 12 movable baffles 105, power compartments 106, and a chassis 107. The monitoring device 103 is provided on a middle of the top cover 102. The wind generator set 104 is provided on an edge of the top cover 102. An outer side of the top cover 102 is provided with a photovoltaic power generator 101. The top cover 102 is fixed on the chassis 107. Six power compartments 106 are symmetrically arranged at six ends of the chassis 107. Each power compartment 106 is provided with a steering device 111 therein. Two movable baffles 105 are arranged outer side of each power compartment 106. Preferably, the top cover 102 and the chassis 107 both adopt a regular hexagonal structure.

Figure 3:
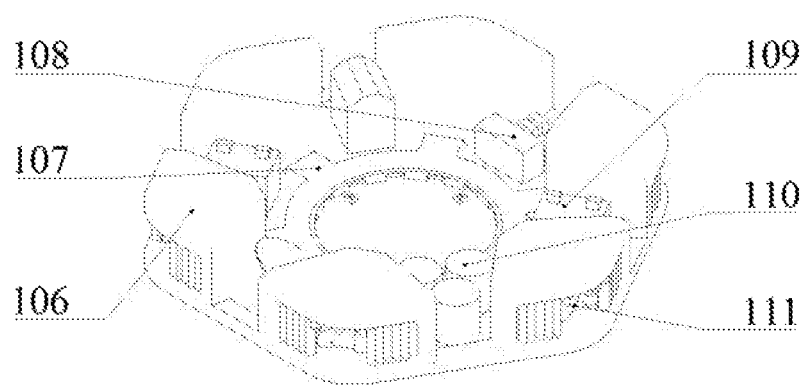
FIG. 3 is a schematic diagram of an internal structure of a chassis of the platform of the six-legged polar research vehicle with tracked feet.

As shown in FIG. 3, an internal combustion engine power device 108, a power battery pack 109 and an oil tank 110 are further arranged between the power compartments 106 on the chassis 107.

Figure 4:
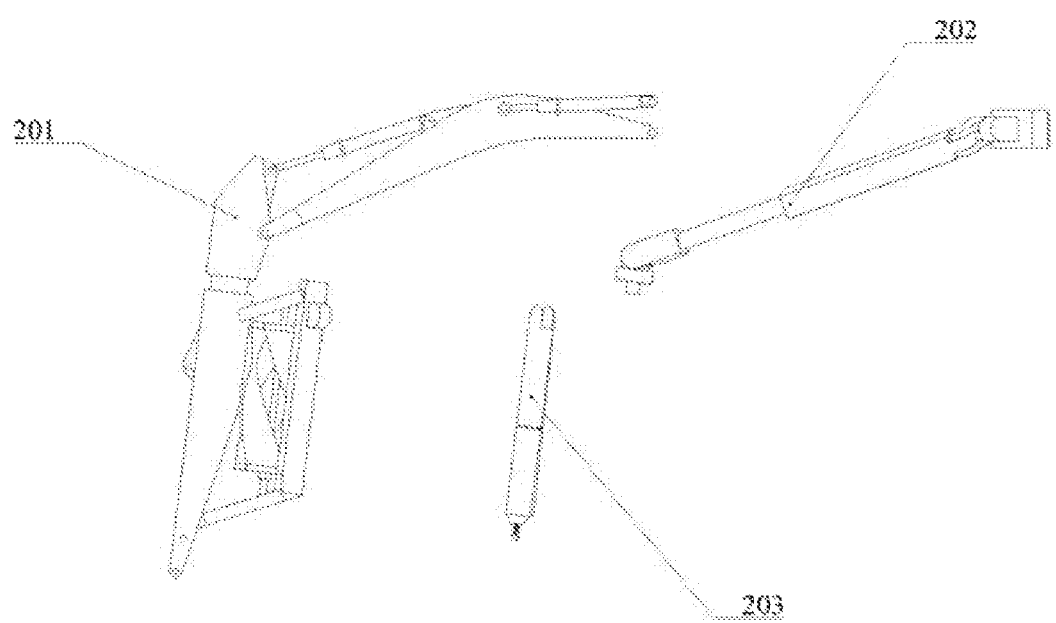
FIG. 4 is a schematic diagram of a leg of the six-legged polar research vehicle with tracked feet.
Figure 5:
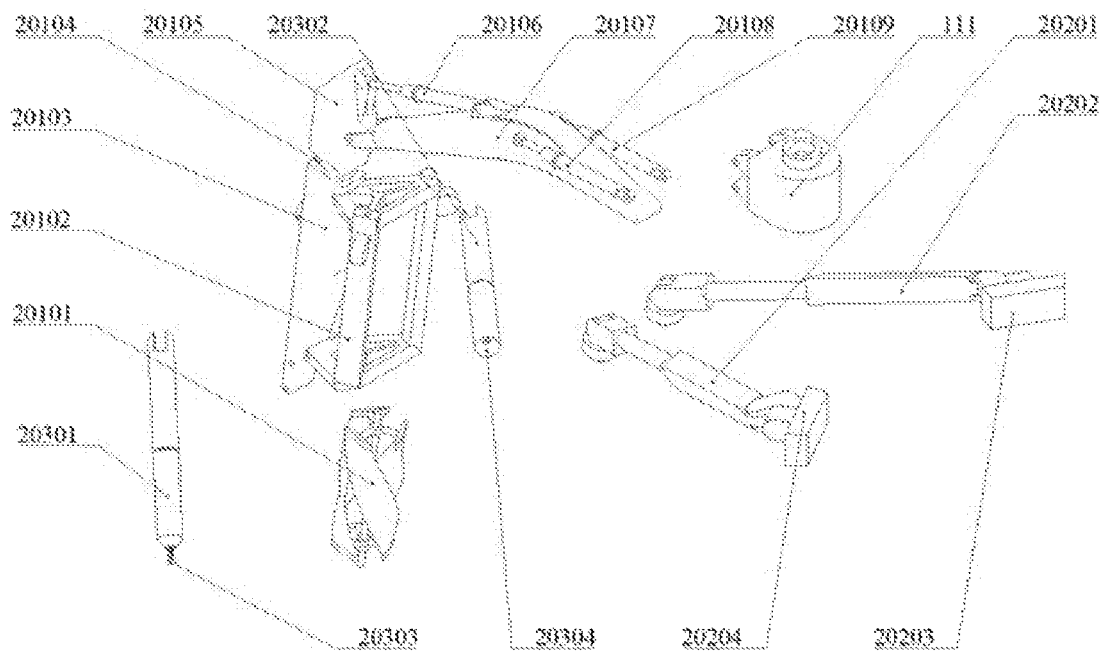
FIG. 5 is an exploded view of the leg of the six-legged polar research vehicle with tracked feet.

As shown in FIGS. 4-5, the six legs 2 have the same structure. Specifically, each of the six legs 2 include a main traveling device 201, an auxiliary traveling device 202, and a connecting device 203. An upper end of the main traveling device 201 is connected to the steering device 111 of the platform 1, and a lower end of the main traveling device 201 is connected to a tracked foot 3. An upper end of the auxiliary traveling device 202 is connected to the chassis 107, and a lower end of the auxiliary traveling device 202 is connected to the main traveling device 201. The connecting device 203 is arranged on the main traveling device 201.

The main traveling device 201 specifically includes an upper leg 20107, a middle leg 20105, a damping device 20104, a lower leg 20103, a wind power generator compartment 20102, a wind power generator 20101, two upper leg hydraulic pushrods 20108 and 20109 with same structure and a middle leg hydraulic pushrod 20106. An upper end of the upper leg 20107 is connected to the steering device 111. A lower end of the upper leg 20107 is connected to a middle portion of the middle leg 20105. One end of the damping device 20104 is connected to a lower end of the middle leg 20105, and the other end of the damping device 20104 is connected to an upper end of the lower leg 20103. A lower end of the lower leg 20103 is connected to the tracked foot slewing device 303. A middle portion of the lower leg 20103 is provided with the wind power generator compartment 20102. The wind power generator 20101 is arranged in the wind power generator compartment 20102. The two upper leg hydraulic pushrods 20109 are uniformly arranged at opposite sides of the upper leg 20107. One end of each upper leg hydraulic pushrod 20109 is connected to the steering device 111, and the other end of each upper leg hydraulic pushrod 20109 is connected to a middle portion of the upper leg 20107. One end of the middle leg hydraulic pushrod 20106 is connected to the middle portion of the upper leg 20107, and the other end of the middle leg hydraulic pushrod 20106 is connected to an upper end of the middle leg 20105.

The auxiliary traveling device 202 includes two extensible auxiliary rods 2011, 20202 and auxiliary rod bases 20203, 20204 uniformly arranged on opposite sides of the main traveling device 201. Bottoms of auxiliary rod bases 20203, 20204 are fixed between two adjacent power compartments. The auxiliary rod bases 20203, 20204 are separately connected to one end of the extensible auxiliary rods 20201, 20202, and the other end of each extensible auxiliary rod 20201, 20202 is connected to a top of the wind power generator compartment 20102.

The connecting device 203 includes a extensible tapered connecting rod 20302 and a extensible bar-type connecting rod 20301. An upper end of the retractable tapered connecting rod 20302 is connected to the wind power generator compartment 20102. An upper end of the extensible bar-type connecting rod 20301 is connected to the wind power generator compartment 20102.

Figure 6:
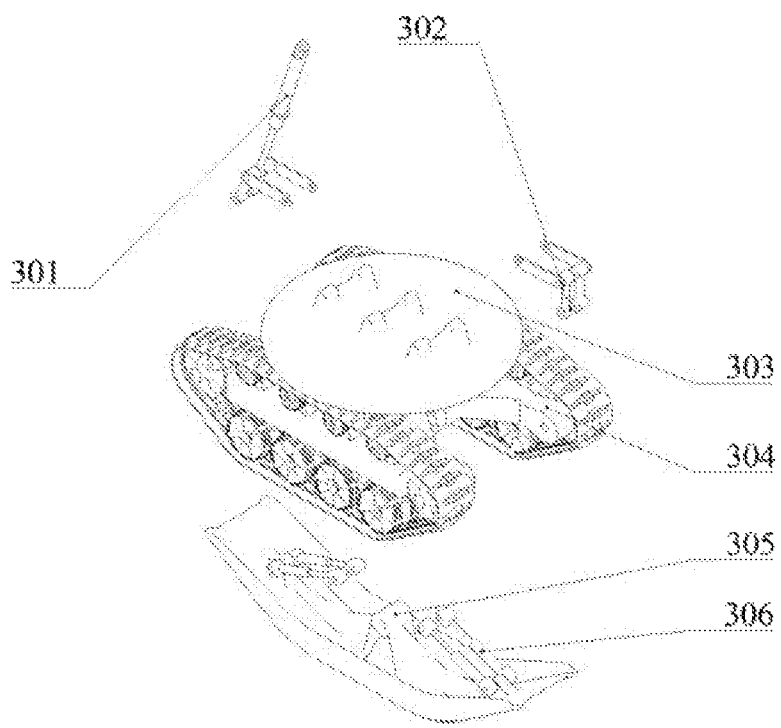
FIG. 6 is a schematic diagram of tracked feet of the six-legged polar research vehicle with tracked feet.
Figure 7:
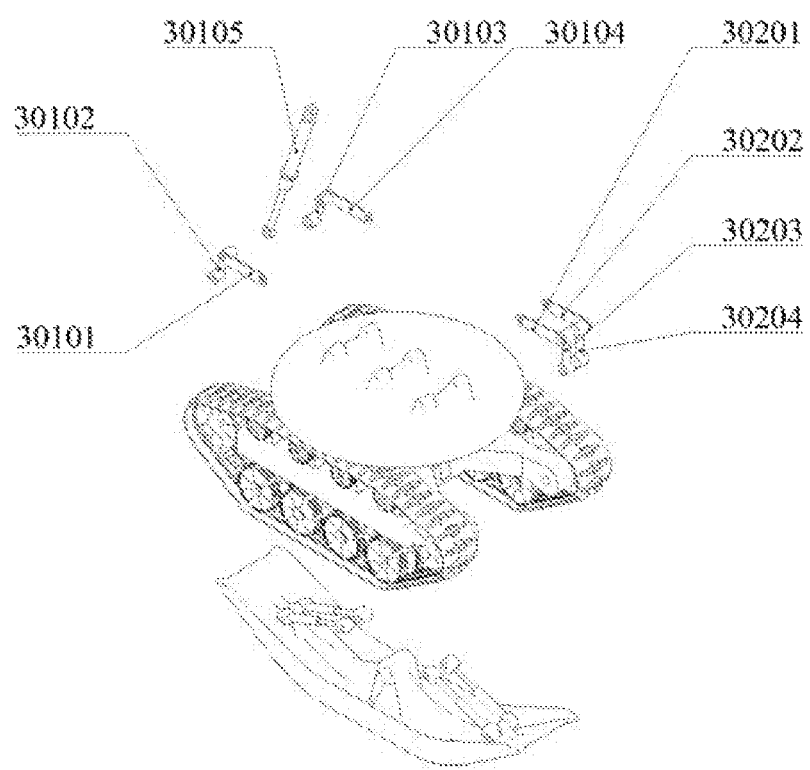
FIG. 7 is an exploded view of the tracked feet of the six-legged polar research vehicle with tracked feet.

As shown in FIGS. 6 and 7, the six tracked feet have the same structure, each including a main flipping mechanism 301, an auxiliary flipping mechanism 302, a tracked foot slewing device 303, a crawler 304, a sliding plate 305 and a suspension 306. The main flipping mechanism 301 is arranged at a front side of the lower end of the main traveling device 201. The auxiliary flipping mechanism 302 is arranged at a rear side of the lower end of the main traveling device 201. The tracked foot slewing device 303 is arranged above a middle of the crawler 304. The sliding plate 305 is arranged under the crawler 304. A middle of the sliding plate 305 is connected to the crawler 304. The suspension 306 is arranged on an upper portion of the sliding plate 305. An upper end of the suspension 306 is connected to the crawler 304. A lower end of the suspension 306 is connected to the sliding plate 305.

The main flipping mechanism 301 includes two main connecting levers 30101, 30104 in parallel with each other, two main rocker 30102, 30103 in parallel with each other and a flipping hydraulic pushrod 30105. One end of the main connecting lever 30101, 30104 is connected to the lower end of the lower leg 20103, and the other end of the main connecting lever 30101, 30104 is connected to an upper end of the main rocker 30102, 30103. A lower end of the main rocker 30102, 30103 is connected to the tracked foot slewing device 303. One end of the flipping hydraulic pushrod 30105 is connected to the upper end of the main rocker 30102, 30103, and the other end of the flipping hydraulic pushrod 30105 is connected to the middle of the lower leg 20103.

The auxiliary flipping mechanism 302 includes two auxiliary connecting rods 30201, 30202 in parallel with each other and two auxiliary rockers 30203, 30204 in parallel with each other. One end of each auxiliary connecting rod 30201, 30202 is connected to the lower end of the lower leg 20103, and the other end of each auxiliary connecting rod 30201, 30202 is connected to an upper end of each auxiliary rocker 30203, 30204. A lower end of each auxiliary rocker 30203, 30204 is connected to the tracked foot slewing device 303.

The six-legged polar research vehicle with tracked feet can achieve traveling, obstacles crossing and platform lowering.

Figure 8:
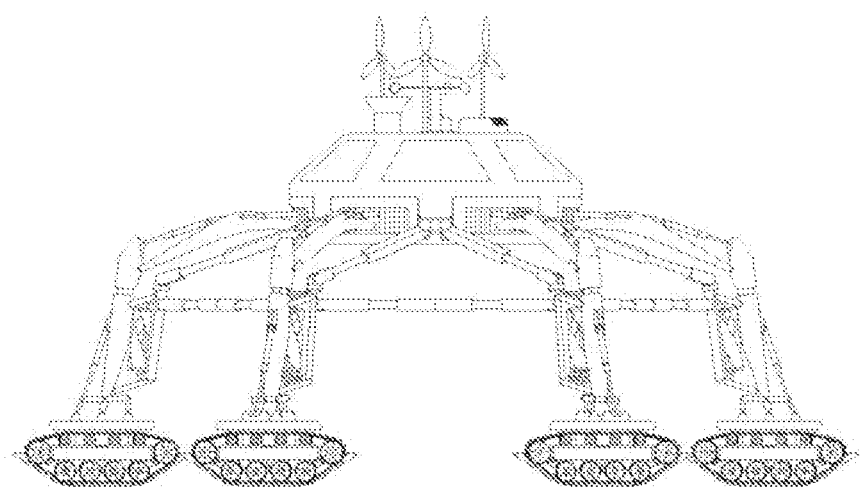
FIG. 8 is a schematic diagram showing the six-legged polar research vehicle with tracked feet in a travelling state.

FIG. 8 shows an embodiment of the six-legged polar research vehicle in a traveling state. The six tracked foot slewing devices 303 drive the six crawlers 304 to rotate an appropriate angle to the traveling direction. In the connecting device 203 of the leg, the adjacent extensible bar-type connecting rod 20301 and the extensible tapered connecting rod 20302 are stretched and extended. A locking pin 20303 arranged at an end of the extensible bar-type connecting rod 20301 is inserted into a taper hole 20304 arranged at an end of the retractable tapered connecting rod 20302, realizing a connection and a synchronous traveling of the three legs.

Figure 9:
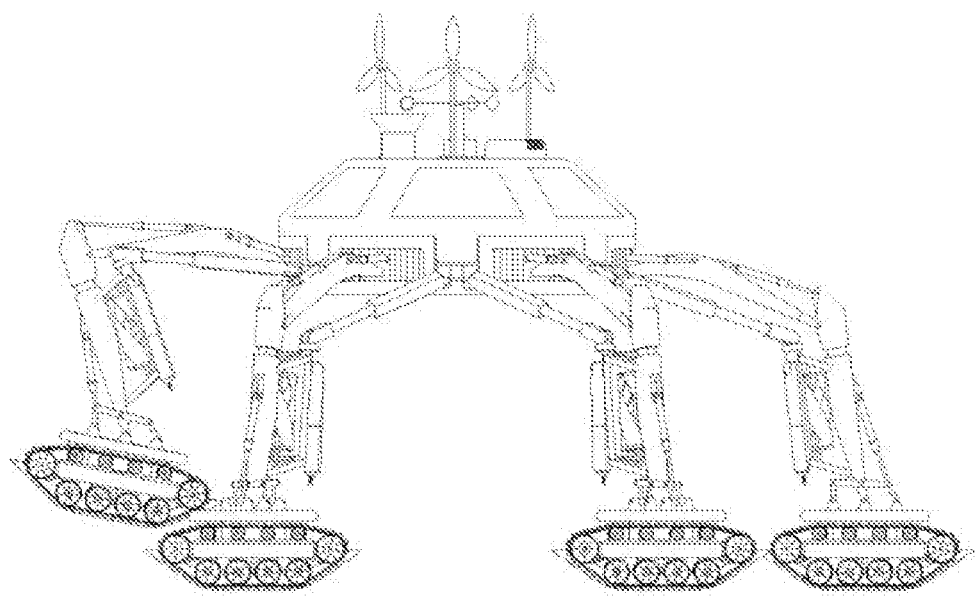
FIG. 9 is a schematic diagram showing the six-legged polar research vehicle with tracked feet being in a retraction state when the research vehicle is crossing an obstacle.

FIG. 9 shows an embodiment of the six-legged polar research vehicle when crossing the obstacle. When the six-legged polar research vehicle with tracked feet is facing an obstacle, the extensible tapered connecting rod 20302 and the extensible bar-type connecting rod 20301 are unlocked and retracted to opposite sides of the wind power generator compartment 20102. Then the upper leg hydraulic pushrods 20108, 20109 are retracted to drive the upper leg to rotate to an appropriate position, the middle leg hydraulic pushrod 20106 is stretched to drive the middle leg 20105 to rotate to an appropriate position, and the extensible auxiliary rods 2011, 20202 are stretched to drive the lower leg 20103 to rotate to an appropriate position. At the same time, the flipping hydraulic pushrod 30105 is retracted, and the main flipping mechanism 301 and the auxiliary flipping mechanism 302 drive the crawler 304 to turn over to an appropriate position. After the crawler 304 is lifted, the corresponding steering device 111 on the platform 1 drives the crawler 304 to rotate at an appropriate angle in the horizontal direction, thereby avoiding the obstacle.

Figure 10:
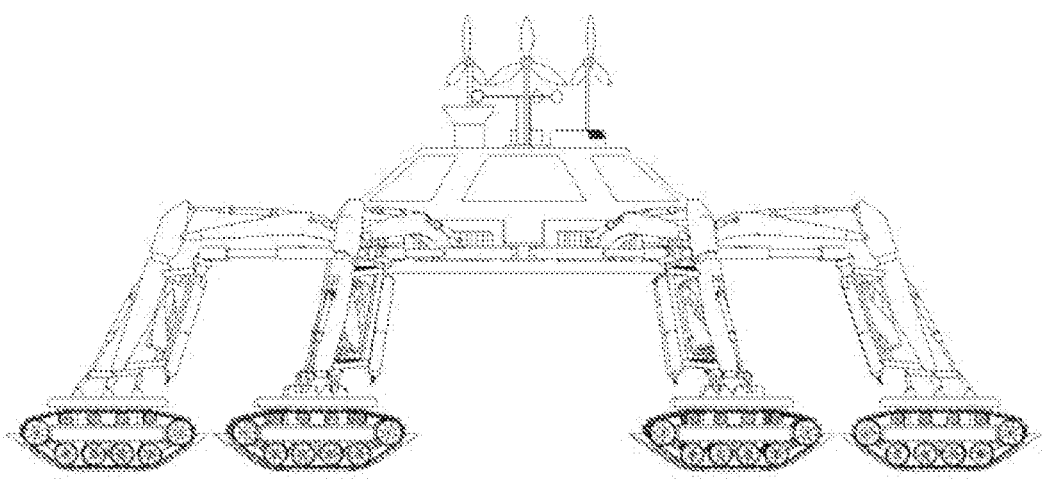
FIG. 10 is a schematic diagram showing the six-legged polar research vehicle with tracked feet in a lowering state.

FIG. 10 shows an embodiment of the six-legged polar research vehicle in a lowering state. The extensible tapered connecting rod and the bar-type connecting rod are driven to be unlocked and retracted to opposite sides of the wind power generator compartment 20102. The upper leg hydraulic pushrod is retracted to drive the upper leg to rotate at an appropriate angle. The middle leg hydraulic pushrod 20106 is retracted to drive the middle leg 20105 to rotate at an appropriate angle. The retractable auxiliary rods 20201, 20202 are retracted and the flipping hydraulic pushrod 30105 is retracted to drive the lower leg 20103 to rotate to an appropriate position.

What is claimed is:

1. A six-legged polar research vehicle with tracked feet, comprising:

a platform, six legs separately arranged at six ends of the platform, and six tracked feet arranged below the six legs;

wherein the platform comprises a top cover, a chassis, a photovoltaic power generator, a monitoring device, a wind generator set, six power compartments and six steering devices; the monitoring device and the wind generator set are arranged on the top cover; the photovoltaic power generator is arranged on an outer side of the top cover; the top cover is fixed on the chassis; the six power compartments are separately arranged at six ends of the chassis; each power compartment is provided with a steering device therein; movable baffles are arranged on outer sides of the power compartments; each of the six legs comprises a main traveling device, an auxiliary traveling device and a connecting device; an upper end of the main traveling device is connected to the steering device of the platform, and a lower end of the main traveling device is connected to an tracked foot; an upper end of the auxiliary traveling device is connected to the chassis, and a lower end of the auxiliary traveling device is connected to the main traveling device; the connecting device is arranged on the main traveling device; each of the six tracked feet comprises a main flipping mechanism, an auxiliary flipping mechanism, a tracked foot slewing device, a crawler, a sliding plate and a suspension; the main flipping mechanism is arranged at a front side of the lower end of the main traveling device; the auxiliary flipping mechanism is arranged at a rear side of the lower end of the main traveling device; the tracked foot slewing device is arranged above a middle of the crawler; the sliding plate is arranged under the crawler; a middle of the sliding plate is connected to the crawler; the suspension is arranged on an upper portion of the sliding plate; and an upper end of the suspension is connected to the crawler.

2. The six-legged polar research vehicle of claim 1, wherein the main traveling device comprises an upper leg, a middle leg, a damping device, a lower leg, a wind power generator compartment, wind power generator, two upper leg hydraulic pushrods and a middle leg hydraulic pushrod; an upper end of the upper leg is connected to the steering device; a lower end of the upper leg is connected to a middle portion of the middle leg; one end of the damping device is connected to a lower end of the middle leg; and the other end of the damping device is connected to an upper end of the lower leg;

a lower end of the lower leg is connected to the tracked foot slewing device; a middle portion of the lower leg is provided with the wind power generator compartment; the wind power generator is arranged in the wind power generator compartment; the two upper leg hydraulic pushrods are uniformly arranged at opposite sides of the upper leg; one end of each upper leg hydraulic pushrod is connected to the steering device, and the other end of each upper leg hydraulic pushrod is connected to a middle portion of the upper leg; one end of the middle leg hydraulic pushrod is connected to the middle portion of the upper leg, and the other end of the middle leg hydraulic pushrod is connected to an upper end of the middle leg.

3. The six-legged polar research vehicle of claim 1, wherein the auxiliary traveling device comprises two extensible auxiliary rods and auxiliary rod bases uniformly arranged on opposite sides of the main traveling device;

a bottom of each auxiliary rod base is fixed between two adjacent power compartments; each auxiliary rod base is connected to one end of each extensible auxiliary rod, and the other end of each extensible auxiliary rod is connected to a top of the wind power generator compartment.

4. The six-legged polar research vehicle of claim 1, wherein the connecting device comprises a extensible tapered connecting rod and a extensible bar-type connecting rod; an upper end of the retractable tapered connecting rod and an upper end of the extensible bar-type connecting rod are connected to the wind power generator compartment, respectively.

5. The six-legged polar research vehicle of claim 1, wherein the main flipping mechanism comprises two main connecting levers in parallel with each other, two main rocker in parallel with each other and a flipping hydraulic pushrod; one end of the main connecting lever is connected to the lower end of the lower leg, and the other end of the main connecting lever is connected to an upper end of the main rocker; a lower end of the main rocker is connected to the tracked foot slewing device; one end of the flipping hydraulic pushrod is connected to the upper end of the main rocker, and the other end of the flipping hydraulic pushrod is connected to the middle of the lower leg.

6. The six-legged polar research vehicle of claim 1, wherein the auxiliary flipping mechanism comprises two auxiliary connecting rods in parallel with each other and two auxiliary rockers in parallel with each other; one end of each auxiliary connecting rod is connected to the lower end of the lower leg, and the other end of each auxiliary connecting rod is connected to an upper end of each auxiliary rocker; and a lower end of each auxiliary rocker is connected to the tracked foot slewing device.

* * * * *